United States Patent [19]
Chun

[11] Patent Number: 5,783,744
[45] Date of Patent: Jul. 21, 1998

[54] ENGINE KNOCKING DETECTION SYSTEM

[75] Inventor: Kwang-Hee Chun, Seoul, Rep. of Korea

[73] Assignee: Kia Motors Corporation, Seoul, Rep. of Korea

[21] Appl. No.: 691,636

[22] Filed: Aug. 2, 1996

[30] Foreign Application Priority Data

Jun. 5, 1996 [KR] Rep. of Korea ............... 96-15024

[51] Int. Cl.$^6$ ............................................. G01M 15/00
[52] U.S. Cl. ..................... 73/116; 123/419; 123/436; 701/110; 701/111
[58] Field of Search ............................ 73/116, 117.2, 73/117.3; 123/419, 425, 436; 701/110, 111

[56] References Cited

U.S. PATENT DOCUMENTS 5,041,980 8/1991 Maddock et al. .............. 364/431.03
5,095,742 3/1992 James et al. ........................ 73/116

Primary Examiner—George M. Dombroske

[57] ABSTRACT

A knocking detecting system has an electronic control unit to detect the knocking caused by an abnormal combustion of a gasoline engine. The electronic control unit determines whether the knocking is generated according to an angular velocity variation. Specifically, the electronic control unit compares a variation of the crank angular velocity with respect to a predetermined variation value in the ignition area of the engine. Accordingly, the electronic control unit determines whether the knocking is generated 8 Claims, 2 Drawing Sheets

ENGINE KNOCKING DETECTION SYSTEM

FIELD OF THE INVENTION

The present invention relates generally to an engine knocking detecting system, and more particularly, to a knocking detection system which senses engine knocking by means of a crank angular velocity sensor without an additional knocking sensor.

PRIOR ART

Generally, in the operation of a gasoline internal combustion engine, a power stroke produced by timed cylinder firings is appropriately transmitted through a connecting rod and crank to drive the vehicle. Unfortunately, knocking sometimes occurs which is an abnormal combustion state caused by cylinder misfiring during for the power stroke. Knocking can result in loud sound and violent vibrations within the combustion chamber.

In the knocking state, pressure abruptly increases, and vibration caused by rising gas pressure is generated in the cylinder. In addition, heat transmitted to the combustion chamber wall increases. Consequently temperature of the combustion chamber gradually increases from continuous knocking. As a result, a number of holes or pits are formed on the head of pistons (made of the aluminium (Al) alloy respectively disposed in the cylinders). Furthermore, due to the high temperature of the piston, fuel is combusted earlier than the proper time of ignition.

A knocking detection system is widely used in the correction of knocking generated by an abnormal combustion before a normal ignition timing while driving the engine.

FIG. 1 is a flow chart of a conventional knocking detecting system. As shown in FIG. 1, a knocking sensor additionally mounted to the vehicle senses the frequency of vibration of an engine, and then transmits a signal corresponding to the frequency of vibration of the engine to an electronic control unit. The electronic control unit compares the frequency from the knocking sensor with a frequency indicative of a normal engine state, and then determines whether knocking is generated. In the case of knocking, the electronic control unit delays the timing of ignition of an ignition plug with a predetermined delay value, and controls the ignition timing of the ignition plug according to a load and an engine rpm, to correct engine knocking.

If there is no engine knocking, the electronic control unit controls the ignition timing of the combustion chamber according to engine load and rpm.

Unfortunately, the conventional knocking detection system described above requires to be mounted the additional knocking sensor and various components based on this sensor, thereby increasing the production cost of the vehicle.

SUMMARY OF THE INVENTION

It is an object of the present invention to determine engine knocking by using a crank angular velocity sensor without mounting additional components, and to correct knocking as a while reducing the cost of the vehicle.

In order to achieve this object, the knocking detection system according to the invention has an electronic control unit to detect knocking caused by an abnormal engine combustion. The electronic control unit determines whether knocking is generated according to a variation in crank angular velocity. Specifically, the electronic control unit compares a variation of the crank angular velocity with respect to a predetermined variation value in ignition timing. The electronic control unit determines whether knocking is generated and corrects the problem.

BRIEF DESCRIPTION OF THE ATTACHED DRAWINGS

The preferred embodiment of the present invention will further explain in detail with reference to the following detailed description, appended claim, and attached drawings, wherein:

DETAILED DESCRIPTION OF THE INVENTION

Figure 1:
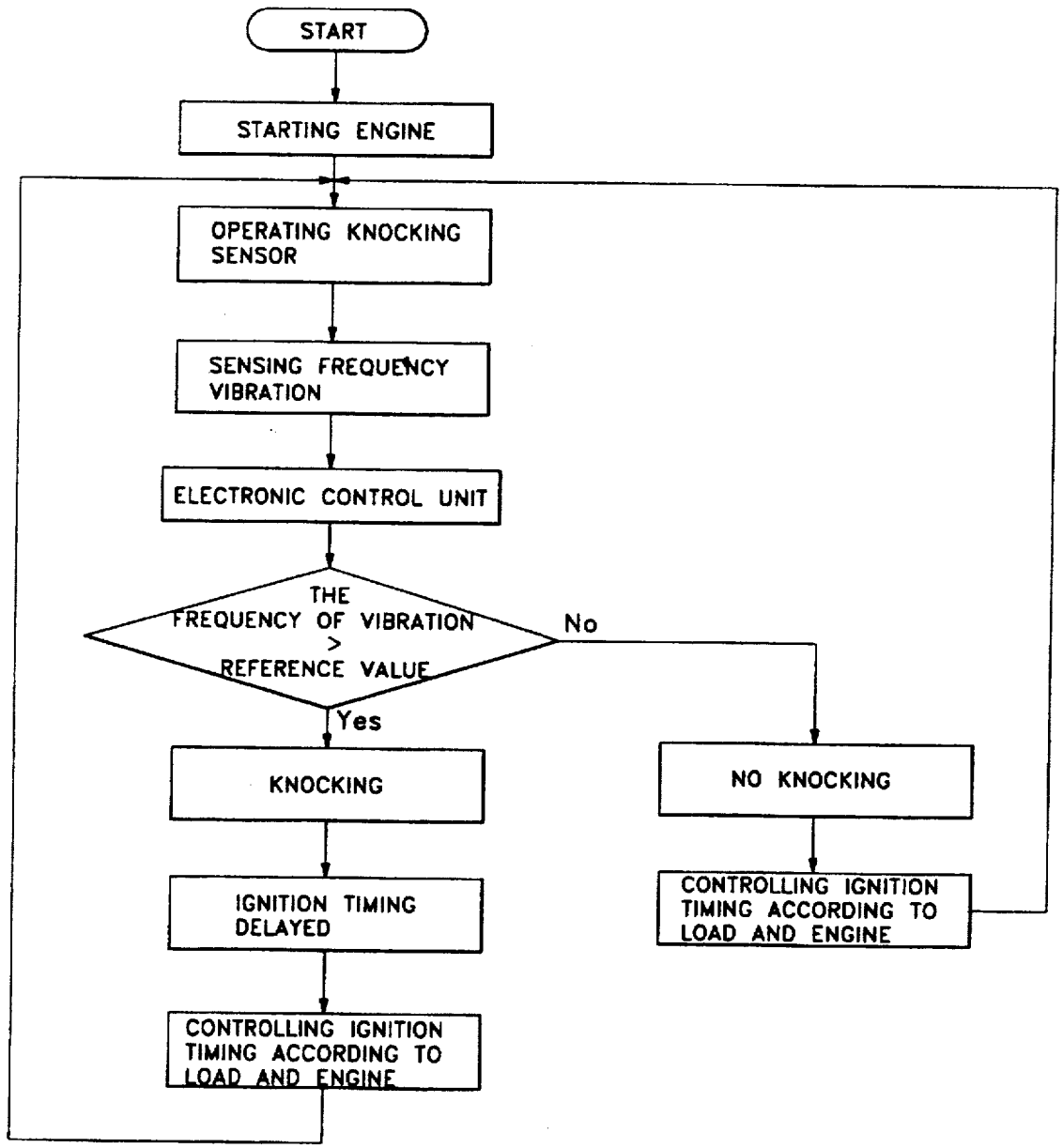
FIG. 1 is a flow chart of a conventional knocking detection system.
Figure 2:
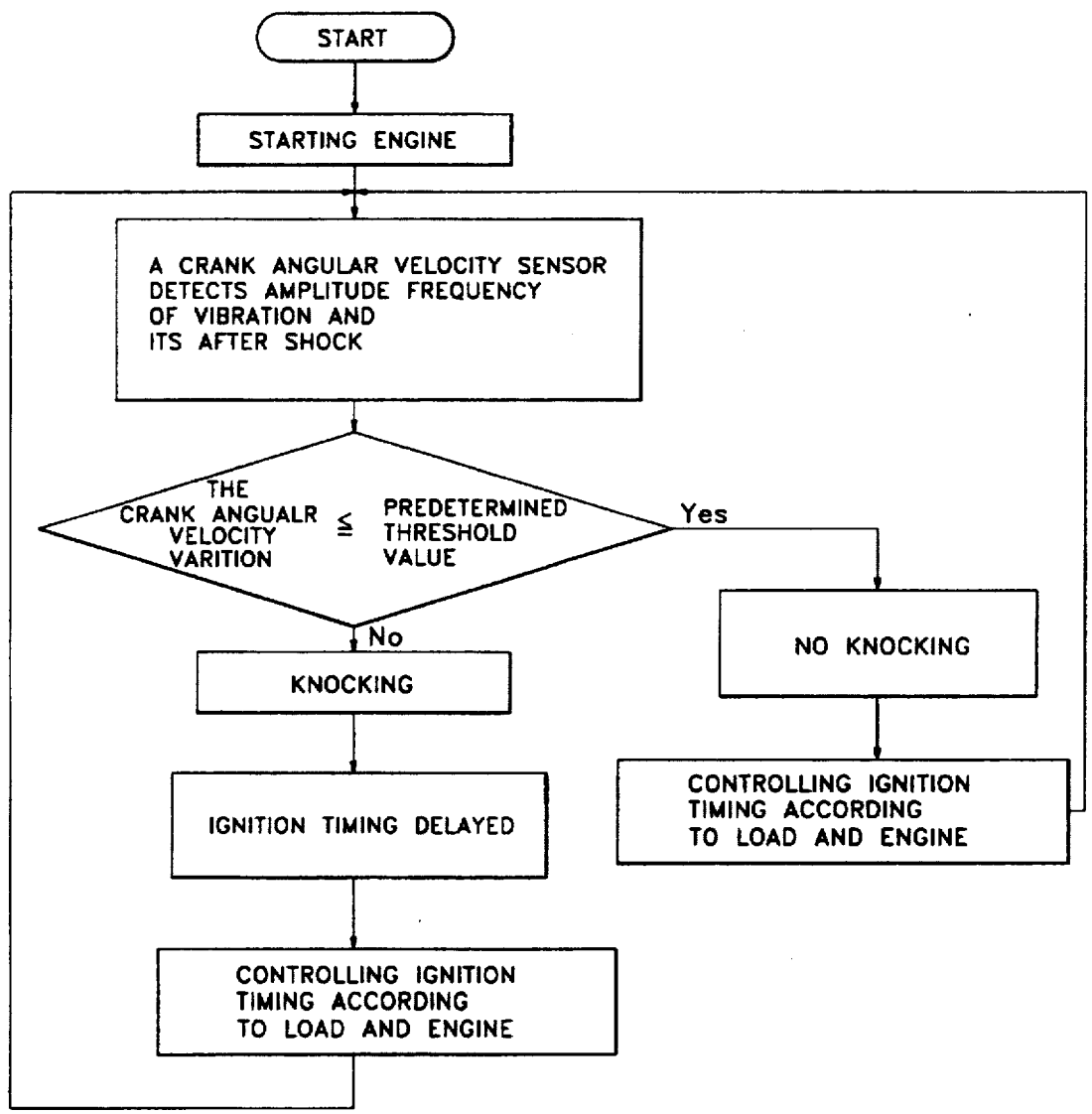
FIG. 2 is a flow chart of a knocking detecting system in accordance with a preferred embodiment of the present invention.

A detailed description of the present invention will now be made with reference to FIG. 2.

An electronic control unit (hereinafter referred to as "ECU") controls the ignition timing of an ignition plug during a power stroke of an engine. The ECU measures angular velocity variation of the crank with an engine rpm sensor. The angular velocity variation depends upon a torque variation in the ignition area. A crank angular velocity sensor detects an amplitude and frequency of vibration and its after shock or follow-up vibration. The ECU compares the obtained amplitude and frequency thereof with the predetermined theshold value and thus determines whether knocking is generated when the obtained value is larger than the predetermined threshold value.

When the variation range of the predetermined knocking threshold value is less than that of the crank angular velocity variation outputted from the crank angular velocity sensor, the electronic control unit determines that the torque is too high and that knocking is generated.

If knocking is generated, the electronic control unit controls the ignition timing of the ignition plug by a predetermined delayed value, and again controls the ignition timing of the ignition plug according to both load and engine rpm, so that the engine is corrected to a normal state.

When the variation range of a predetermined knocking threshold value is greater than that of the crank angular velocity outputted from the crank angular velocity sensor, the electronic control unit determines that there is no knocking, and controls the ignition timing of the ignition plug according to both the load and the engine rpm.

The electronic control unit according to the present invention repeats the above-identified operations, and corrects knocking within a short timing period, thereby preventing knocking in the engine.

The knocking detection system determines knocking by using the crank angular velocity sensor without mounting additional components, and corrects knocking as the normal state, thereby reducing the cost of production of vehicle, simultaneously improving a performance of the engine.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A knock detection system, comprising a crank angular velocity sensor and an electronic control unit which determines whether knock is present according to an angular velocity variation detected by the crank angular velocity sensor, wherein said electronic control unit compares the detected angular velocity variation with a predetermined threshold value and determines that knock is present when the detected angular velocity variation is larger than the threshold value.

2. A knock detection system as recited in claim 1, wherein when knock is present, the electronic control unit controls ignition timing by a predetermined delayed value.

3. A knock detection system as recited in claim 2, wherein said electronic control unit further controls ignition timing as a function of load and engine RPM.

4. A knock detection system as recited in claim 1, wherein said crank angular velocity sensor and said electronic control unit control knock without a knock sensor.

5. An apparatus for detecting and controlling knocking in an internal combustion engine having a rotating crank member driven by a plurality of cylinders, comprising:

a sensor connected to measure angular velocity of said rotating crank;

an electronic control unit for controlling ignition timing of said internal combustion engine and for receiving data from said sensor, said control unit comparing the sensor data to predetermined angular velocity data to determine whether knocking has occurred;

said control unit adjusting the ignition timing of said cylinders when knocking is detected to reduce or eliminate knocking within the engine.

6. An apparatus for detecting and controlling knocking in an internal combustion engine according to claim 1, wherein said sensor is an engine rpm sensor.

7. An apparatus for detecting and controlling knocking in an internal combustion engine according to claim 1, wherein said sensor detects an amplitude and frequency of vibration of said rotating crank.

8. An apparatus for detecting and controlling knocking in an internal combustion engine according to claim 1, the control unit controls the ignition timing by adjusting the ignition timing to a predetermined value.

\* \* \* \* \*